United States Patent [19]
Yamamoto et al.

[11] Patent Number: 5,843,391
[45] Date of Patent: Dec. 1, 1998

[54] METHOD OF MANUFACTURING SILICON SULFIDE

[75] Inventors: Kazutomi Yamamoto; Nobuhiko Ikeda, both of Hino, Japan

[73] Assignee: Furukawa Co., Ltd., Tokyo, Japan

[21] Appl. No.: 839,677

[22] Filed: Apr. 15, 1997

[30] Foreign Application Priority Data

Apr. 16, 1996 [JP] Japan ................................ 8-094396

[51] Int. Cl.$^6$ .......................... C01B 33/00; C01B 17/00
[52] U.S. Cl. ...................... 423/344; 423/324; 423/565; 423/DIG. 12
[58] Field of Search ..................... 423/565, 344, 423/324, DIG. 12

[56] References Cited

U.S. PATENT DOCUMENTS

| | | | |
|---|---|---|---|
| 2,589,653 | 3/1952 | Alvarez-Tostado et al. | 423/344 |
| 2,766,103 | 10/1956 | Nielsen et al. | 423/344 |
| 3,321,326 | 5/1967 | Young | 423/565 |
| 4,491,639 | 1/1985 | Happel et al. | 502/219 |

FOREIGN PATENT DOCUMENTS

| | | | |
|---|---|---|---|
| 63-79716 | 4/1988 | Japan | 423/344 |
| 899464 | 1/1982 | U.S.S.R. | 423/344 |

OTHER PUBLICATIONS

Emons et al, "Darstellung und Eigenschaften von Fasrigem Siliciummono–Sulfid", Z. Chem. 8(1), pp. 31–32, Jan. 1968. Chemical Abstract: 65336n "Preparation and properties of fibrous silicon monosulfide", Emons et al, vol. 68, 1968 (no month).

Mellor, "A Comprehensive Treatise on Inorganic and Theoretical Chemistry" vol., VI, QD 31 M4, 1947 (no month), pp. 985–990.

European Search Report dated Jun. 23, 1997 for European Appln. No. EP97105989.

Chemiker Zeitung, vol. 107, No. 10; 1983 Heidelberg DE, pp. 289–290, R.G. Sobott et al. (no month).

"Gmelins Handbuch De Anorganischer Chemie 8$^{th}$ Completely reworked edition Silicium Part B System–No. 15" 1959 Verlay Chemie, GmbH, p. 747, line 5–line 8. (no month).

*Primary Examiner*—Ngoc-Yen Nguyen
*Attorney, Agent, or Firm*—Young & Basile, P.C.

[57] ABSTRACT

Silicon sulfide is manufactured from the fine powder of silicon having a particle size in the range of 60 to 100$\mu$, covered thoroughly with sulfur at lower temperature less than 700° C. in vacuum. In order to produce the silicon sulfide, silicon should be ground in a non-oxidizing atmosphere to prevent the formation of a silicon oxide layer that remains in the product and degrades the purity of the product. The silicon powder is dispersed sufficiently in the molten sulfur. At this time, the quantity of added sulfur needs more than 1.1 times in comparison with the stoichiometric quantity of silicon sulfide. All surfaces of silicon powder should be covered with sulfur to avoid sintering between silicon particles in the whole process of the reaction.

5 Claims, No Drawings

METHOD OF MANUFACTURING SILICON SULFIDE

BACKGROUND OF THE INVENTION

1. Field of the Invention

This invention relates to a method of manufacturing silicon sulfide.

2. Description of the Prior Art

Some methods for synthesizing silicon sulfide have been known as follows:

(1) to react silicon oxide with aluminum sulfide in an atmosphere of inert gas, (2) thermal cracking of organic silicon compounds, (3) to react silicon with hydrogen sulfide in an hydrogen atmosphere.

But each method includes some problems to be solved. Namely, in the case of said prior art (1), aluminum sulfide is expensive and this method needs an essentially higher temperature than 1100° C., in the case of said prior art (2), organic silicon compounds is expensive and organic sulfur compounds having an odor are released absolutely in this reaction, and in the case of said prior art (3), this method needs a high temperature greater than 1200° C., therefore the selection of equipment materials has very serious problems.

SUMMARY OF THE INVENTION

Therefore, it is the object to present a method for producing silicon sulfide in which the synthesis of highly pure silicon sulfide is possible at lower temperature so as to expand the width extent of the choice of processing apparatus and material therefore, to make workability preferable and to decrease the energy consumption.

Fine powder of silicon is dispersed into melted sulfur by agitation. The resulting mixture consisting of the silicon powder and surplus sulfur is fed into a vacuum vessel, and heated to produce silicon sulfide.

Silicon sulfide can be manufactured from the fine powder of silicon covered thoroughly with sulfur by the reaction at a lower temperature less than 800° C. in a vacuum. To produce silicon sulfide, silicon should be ground in non-oxiding condition to prevent the formation of a silicon oxide layer that should cause to retard the reaction or necessitate higher temperatures greater than 800° C.

The prepared silicon powder is provided gradually into molten sulfur that is intensely agitated by means of a mechanical agitation and then it is dispersed sufficiently. At this time, the quantity of molten sulfur must be more than 1.1 times the silicon amount for stoichiometric quantity of silicon sulfide.

If the particle size of silicon powder is very small, a large quantity of sulfur must be added, due to the total surface area becoming very large in comparison with larger silicon particles. And also it is difficult to produce the homogeneous silicon powder dispersion in sulfur. In the case of silicon powder having a large surface area by reason of its own shape, the addition of sulfur is also needed.

It is undesirable to reduce the quantity of sulfur because the entire surface area of silicon powder is not covered thoroughly with sulfur so that the reaction does not start at a lower temperature. Furthermore, the considerable amount of silicon powder should remain, just as it is, on account of strong sintering between silicon particles. The strong sintering has a tendency to prohibit the reaction of the mixture in spite of higher temperature.

It is also undesirable that the quantity of sulfur is increased more than the stipulation, because of the labor and energy required for the separation of surplus sulfur from the reacted mixture.

Therefore it is desired that the quantity of sulfur is in the range of 1.1 to 1.8 times the silicon amount for stoichiometric quantity of silicon sulfide. In addition, it is better to adjust the quantity of sulfur in the range of 1.1 to 1.5 times the silicon amount.

In the case of smaller particle sizes of silicon, this reaction occurs more easily because each silicon particle disperses homogeneously in sulfur. However, the purity of silicon sulfide decreases, because of oxidation of the surface of the minute silicon powder. Moreover, there are difficulties that the silicon fine powder may easily turn to dust at handling and not disperse in melted sulfur well because of its flocculation characteristic. There is also a danger factor that the fine particles react vigorously.

If the particle size of silicon powder is larger than $100 \mu m$, the necessary quantity of sulfur to cover silicon powder decreases. But its reaction needs to heat at a high temperature, for example 800° C. and to maintain its temperature for many hours instead of the possibility of reducing the sulfur quantity.

The heating temperature depends on the particle size of silicon powder, and the dispersing conditions of silicon particles in melted sulfur. If the heating temperature is under 400° C., this reaction does not start even though there is enough sufficiently dispersing of silicon and sulfur. If the heating temperature is over 800° C., the non-reacted silicon powder is easy to remain as silicon powder since it is easily sintered by this exthothermic reaction.

If this reaction is conducted at a high temperature, for example 1000° C., the equipment for synthesis of silicon sulfide becomes expensive. Because the internal pressure in the equipment becomes high depending on the reaction temperature, the selection of equipment materials is restricted in order to suppress the corrosion of sulfur or sulfide.

DESCRIPTION OF THE EMBODIMENTS

EXAMPLE 350 g of high pure sulfur powder, (6N), was weighted in a stainless steel cup and then the sulfur was melted in an oil bath at 125° C. 100 g of high pure silicon, (6N), having the particle size of $25 \mu m$ in average was weighted and fed into the molten sulfur gradually, which was agitated by a mechanical mixing apparatus. After that, stirring was continued for one hour in order to cover the silicon surface with sulfur entirely.

This mixture was ground after cooling, and then this granule was put into a quartz tube. Air in the quartz tube was evacuated up to $10 \times 10^{-6}$ Torr and enclosed.

The quartz tube was set in an electric furnace. One part of the quartz tube was maintained at 470 ° C. and the other part was maintained 700° C., respectively, for 150 hours.

The product was porous and its color was bluish white. According to X-ray diffraction, only silicon sulfide was detected.

Comparative Example 1

Example of the embodiments was repeated except that the temperatures of both parts of the quartz tube were kept at 350° C. The product had silicon dispersed in sulfur uniformly and seldom reacted.

Comparative Example 2

Example of the embodiments was repeated except that one part of the container was maintained at 470° C., the other part was maintained at 950° C. The product was not porous and its color was light bluish white. There were some aggregates, which were probably sintered silicons, in the quartz tube.

Comparative Example 3

Example of the embodiments was repeated except that the average particle size was 150 μm. The product was porous and its color was light bluish white, though it had some blackish spots. According to X-ray diffraction, silicon sulfide, silicon and sulfur were detected.

Comparative Example 4

Example of the embodiments was repeated except that the quantity of sulfur was 230 g. The product was porous and had blackish aggregates everywhere.

As described above, silicon powder is dispersed into melted sulfur and covered thoroughly with the sulfur, so silicon sulfide is easily manufactured by beating the mixture consisting of the silicon powder and the sulfur. The method therefore allows wide range of selection of equipment materials and decreased energy consumption.

If sulfur surplus is in the range of 1.1 to 1.8 times for stoichiometric sulfur quantity of silicon sulfide, when silicon powder is dispersed into melted sulfur, the silicon powder can be thoroughly covered with melted sulfur, the silicon powder can be thoroughly covered with melted sulfur, and separation of the surplus sulfur from the reacted mixture can easily be done.

If the mixture fed into the vacuum vessel is heated in the range of 400° to 800° C., pure silicon sulfide is manufactured without problems such as high pressure reaction in the vessel, sintering silicon particles and remaining non-reacted silicon powder.

What is claimed is:

1. A method of manufacturing silicon sulfide comprising:
   dispersing silicon powder into molten sulfur by agitation to form a mixture containing silicon powder dispersed in molten sulfur,
   cooling the mixture containing silicon powder dispersed in molten sulfur to ambient temperature to produce a solid material containing silicon homogeneously dispersed in sulfur,
   grinding the solid material, and
   after grinding, placing the ground material in a vacuum vessel and then heating the material in the range of 400° C. to 700° C. to initiate and maintain reaction therein.

2. The method of manufacturing silicon sulfide according to claim 1, wherein said silicon powder has a size in a range of 60 to 100 μm.

3. The method of manufacturing silicon sulfide according to claim 1, wherein the amount of sulfur used is in the range of 1.1 to 1.8 times the stoichiometric amount.

4. A method of manufacturing silicon sulfide comprising:
   dispersing silicon powder into molten sulfur, the dispersing of silicon powder occurring in a manner which provides essentially uniform dispersion of the silicon powder in the molten sulfur;
   cooling the dispersion to a sufficiently lowered temperature to solidify the dispersion;
   grinding the solidified dispersion;
   subjecting the ground dispersion of silicon powder and sulfur to vacuum pressure; and
   heating the ground dispersion in the range of 400° C. to 700° C. to form the silicon sulfide product.

5. The method of claim 4, wherein the silicon powder has a size in range of 60 to 100 μm.

* * * * *